2,704,779

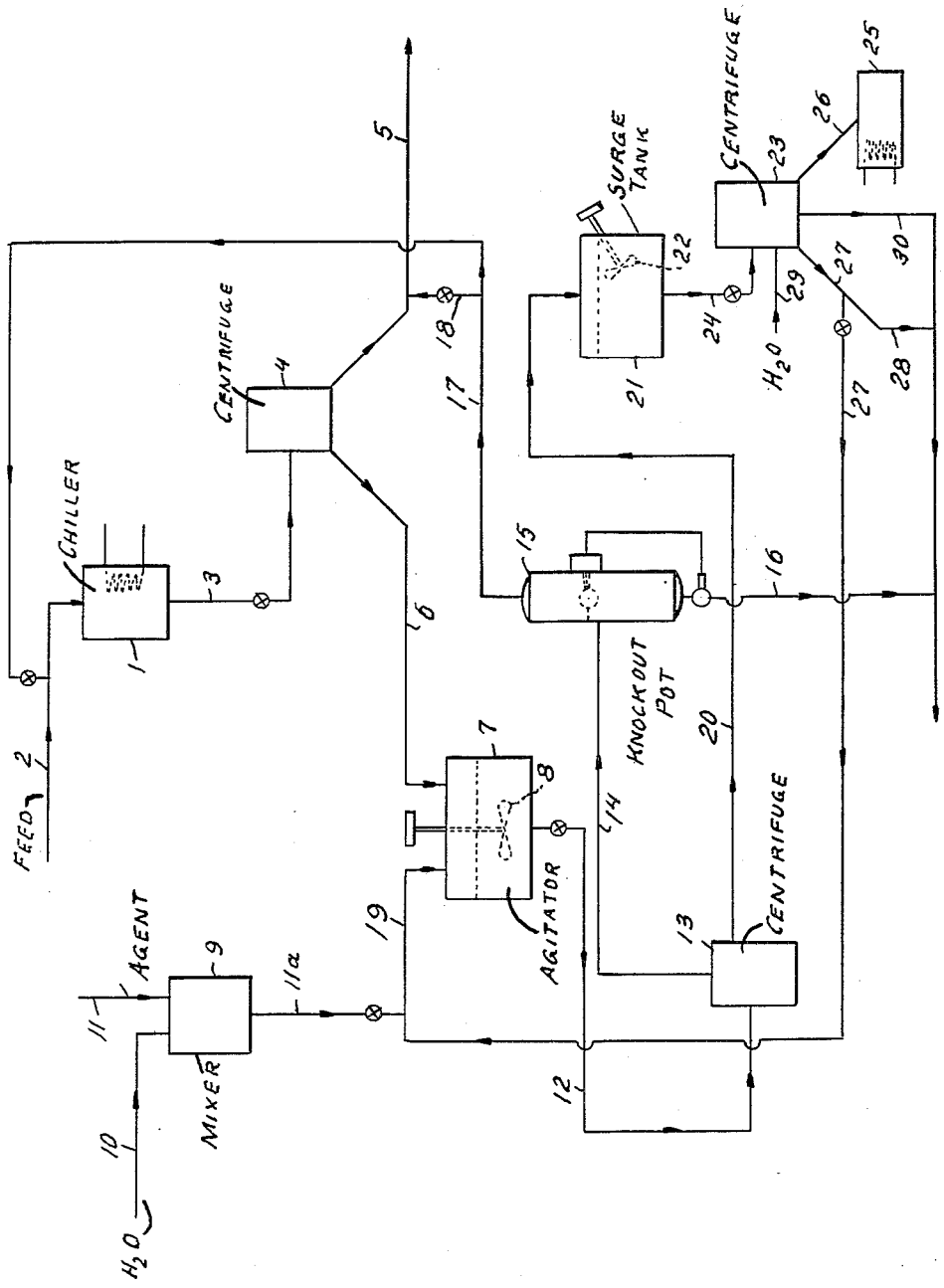

NAPHTHALENE PURIFICATION BY WASHING WITH A SURFACE ACTIVE AGENT

Frank A. Apgar, Chicago, Ill., assignor to Sinclair Refining Company, New York, N. Y., a corporation of Maine Application April 10, 1950, Serial No. 155,067

8 Claims. (Cl. 260—674)

My invention relates to an improved method for purifying crude naphthalene crystals of petroleum origin to a high degree.

Naphthalene may be recovered in substantial yields from petroleum fractions in the form of crystals. For instance, chilling a suitable fraction rich in naphthalene, a 400–430° F. cut of a thermaily-cracked side stream, to a temperature around minus 10° F., then separating out the crystalline mass formed by filtration or centrifugation, results in the recovery of naphthalene crystals in attractive quantities.

However, such crystalline masses are composed essentially of impure or crude naphthalene. In fact, only about 65 to 75% of the mass is pure naphthalene. In appearance, the crystalline mass varies from white to yellowish in color and is very oily. Microscopic examination indicates that the structure of an agglomeration of the crystals is such that relatively large quantities of residual oil and other contaminants can be mechanically retained by the mass. Indeed, conventional filtration and centrifugation techniques are not successful in removing these impurities.

The coal-tar industry has offered several methods for removing the impurities remaining in the crude naphthalene crystalline masses which are chiefly of an oil nature. For instance, there is the "hot-press" method in which the mass of crude crystals is subjected to elevated temperatures somewhat below the melting point of the crystalline cake which is then pressed in order to squeeze out the residual oil from the cake. Another method for purifying the crystals comprises washing the crude crystalline mass in a revolving perforated-basket type centrifuge with a stream of hot water at an elevated temperature below the melting point of the cake. This method effects a decrease in the viscosity of the adhering oil and also imparts a ripping or shearing force to the oil surface, thereby removing some of the residual oil in the crystals.

My experiments employing a bottle type centrifuge indicate that the addition of water alone to the crude crystals, followed by washing and drying of the centrifuged crystals, will result in an increase in the degree of purity. However, the improvement is slight and in most cases cost considerations do not warrant such treatment.

I have now found that crude naphthalene crystals can be purified to a high degree by a very attractive and efficient method. According to my invention, the oil-contaminated crude crystals are contacted with a water solution of a surface active agent, the mixture subjected to the action of centrifugal force, and the naphthalene crystals separated from the centrifugate. Advantageously, my invention includes two stages of purification wherein the naphthalene crystals separated from the centrifugate are then washed and dried. The water solution of the surface active agent contains the agent in relatively small amounts, usually up to about 1% by weight. However, it is not advisable to employ the agent in concentration above its solubility limit in the aqueous medium. In this regard, amounts above about 0.2% by weight of many of these compounds are insoluble in water and hence are unnecessary. The process conditions afford considerable operational latitude but, for economic reasons, atmospheric conditions of temperature and pressure, or conditions closely approximating them, are contemplated.

In a particularly advantageous embodiment of my invention, crude naphthalene crystals are purified and dried in two stages of treatment. For example, an impure crystal mass, containing about 65% to 75% of pure naphthalene and obtained by precipitation from a light cycle stock, is first contacted with an aqueous solution containing 0.2% by weight of an alkyl aryl sulfonate as the surface active agent. The mixture is thoroughly agitated and then centrifuged. A stratification of an oil layer and a layer of crystals in water results. The oil layer is taken off and may be extracted again if it contains sufficient naphthalene. The naphthalene crystals in the aqueous medium containing also the alkyl aryl sulfonate are passed to the second stage where additional water is added. The mixture is then centrifuged in a basket-type centrifuge to separate out the crystals from the liquid. The aqueous solution of the surface active agent removed may be recycled for further use. The purified crystals, about 95% to 99% pure, are passed to a drying zone where they are dried by the application of heat.

According to my invention, I use an aqueous solution of a surface active agent. By surface active agent, I mean an agent whose molecules contain both a hydrophobic portion and a hydrophilic portion, such as a detergent or wetting agent, which by reason of this molecular structure functions to reduce surface or interfacial tension when dissolved in water. I have found that a wide variety of surface active agents are useful in my process. As examples, there are the alcohol sulfate type such as Ocenol sulfate; the alkyl aryl sulfonate type such as sodium alkyl aryl sulfonate; and the succinic acid-derived type such as the dioctyl ester of sodium sulfosuccinic acid. Although these surface active agents are of the anionic class, non-ionic and cationic agents may be used. Advantageously, the agent will contain a strongly hydrophilic group, such as —$C_6H_6SO_3H$, —$SO_3H$ and the salts of these groups, or other strongly hydrophilic groups such as —COONa and —$COONH_4$, for example. In particular, I especially prefer those anionic surface active agents of the alkyl aryl sulfonate and alcohol sulfate types.

The surface active agent should be present in the water solution in small amount, although the most favorable proportion will depend largely upon the purity of the naphthalene to be treated, the nature of the agent itself and the exact process conditions. However, a maximum of about one per cent by weight on the water is the highest concentration I contemplate using, since it is not advisable to employ the agent in considerable excess above its solubility in water. Ordinarily, amounts over about 0.2% by weight are above the water solubility limit of many of these agents. However, according to my studies, it appears that any undissolved part of the agent will adhere to the naphthalene crystals and will not have a deleterious effect if used in amount less than the maximum I have specified. Nevertheless, quantities in excess of the solubility limit add unnecessarily to operational costs. Generally, amounts of about 0.10 to 0.20 per cent by weight will be very satisfactory. Thus since only a relatively small proportion of wetting agent is necessary, large quantities of high purity naphthalene crystals may be prepared economically in accordance with my process.

It is my belief, although my invention is not based on any particular theory, that the surface active agents I use effectively act to reduce the interfacial tension between the oil and water so as to render the adhering oil very susceptible to displacement from the impure crystalline mass. The action of centrifugal force in so separating the oil is aided by the marked difference between the specific gravities of the oil (0.87), water (1.00) and pure naphthalene crystals (1.15). My studies also indicate that when a monomolecular layer of the agent's molecules build up at this interface a maximum degree of separation is afforded, because when a greater concentration is effected there is no corresponding increase in degree of purity. Although the quantity of surface active agent necessary to form this monomolecular layer is small, nevertheless the exact quantity will vary and depends largely upon the degree of dispersion of the crude naphthalene in the water phase, the naphthalene crystal size and the size and shape of the molecules of the surface active agent.

The following examples are intended to more clearly illustrate my invention.

Example I

A mass of crude napthalene crystals, obtained by precipitation at about minus 10° F. from a 400 to 430° F. cut of a light cycle stock, contained 66.4% naphthalene under ultra-violet spectrophotometric analysis. Twenty-five grams of these crystals were placed in a 100 ml. centrifuge bottle and 50 cc. of deionized water only were added. The bottle was shaken by hand to mix its contents thoroughly and then centrifuged at 2000 R. P. M. for fifteen minutes at room temperature. A stratification resulted in the form of an oil layer, a water layer and a crystalline mass in the water layer. The oil and water layers were removed from the crystal mass by suction with a pipette and the crystals remaining were agitated with 50 cc. of water whereupon this wash water was then removed. The remaining crystals were sucked dry on a Buechner funnel and were then placed in a desiccator for about 16 hours. A second ultra-violet spectrophotometric analysis showed these crystals contained 72.1% naphthalene.

Example II

Twenty-five grams of the impure naphthalene crystalline mass employed in Example I were placed in a similar 100 ml. centrifuge bottle. Fifty cc. of a deionized water solution containing 0.2% by weight of a surface active agent were then added. The agent was a sodium alkyl aryl sulfonate (R—$C_6H_4SO_3Na$) known as "Nacconol NRSF," manufactured by the National Aniline Division of the Allied Chemical and Dye Corporation. The bottle was shaken by hand to mix its contents thoroughly and then centrifuged at 2000 R. P. M. for fifteen minutes at room temperature. A stratification resulted in the form of an oil layer, a water layer and a crystalline mass in the water layer. The oil and water layers were removed from the crystal mass by suction with a pipette and the crystals remaining were agitated with 50 cc. of water whereupon this wash water was then removed. The remaining crystals were sucked dry on a Buechner funnel and where then placed in a desiccator for about 16 hours. A second ultra-violet spectrophotometric analysis showed that these crystals now contained 95.8% naphthalene, or were of about 25% greater purity than when water was used alone.

Example III

The procedure and apparatus identical with that of Example II were again used but as the surface active agent, a dioctyl ester of sodium sulfosuccinic acid known as "Aerosol OT," manufactured by the American Cyanamid Company, was used in the same amount. The purified crystals analyzed 95.4% naphthalene, or were of about 25% greater purity than when water was used alone.

Example IV

The procedure and apparatus identical with that of Example II were again used but as the surface active agent an Ocenol sulfate known as "Duponol LS," manufactured by E. I. du Pont de Nemours and Company, Inc., was used in the same amount. The purified crystals analyzed 92.5% naphthalene, or were of about 21% greater purity than when water was used alone.

Example V

The procedure and apparatus identical with that of Example II were again used but as the surface active agent an alcohol sulfate known as "Duponol WA," manufactured by Du Pont, was used in the same amount. The purified crystals analyzed 91.7% naphthalene, or were of about 20% greater purity than when water alone was used.

Example VI

The procedure and apparatus identical with that of Example II were again used but as the surface active agent an isopropyl naphthalene sodium sulfonate known as "Aerosol OS," manufactured by American Cyanamid, was used in the same amount. The purified crystals analyzed 90.0% naphthalene, or were of about 19% greater purity than when water alone was used.

Example VII

A mass of impure crude naphthalene crystals, obtained by precipitation at about minus 10° F. from a 400 to 430° F. cut of a light cycle stock, contained 76.4% naphthalene as revealed by ultraviolet spectrophotometric analysis. Twenty-five grams of these crystals were placed in a 100 ml. centrifuge bottle and 50 cc. of deionized water only were added. The bottle was shaken by hand to mix its contents thoroughly and then centrifuged at 2000 R. P. M. for fifteen minutes at room temperature. A stratification resulted in the form of an oil layer, a water layer and a crystalline mass in the water layer. The oil and water layers were removed from the crystal mass by suction with a pipette and the crystals remaining were agitated with 50 cc. of water whereupon this wash water was then removed. The remaining crystals were sucked dry on a Buechner funnel and were then placed in a desiccator for about 16 hours. A second ultraviolet spectrophotometric analysis showed these crystals contained 88.6% naphthalene.

Example VIII

The procedure and apparatus identical with that of Example VII were again used, but this time 50 cc. of a deionized water solution containing 0.05% by weight of a surface-active agent were added. The surface-active agent was a dioctyl ester of sodium sulfosuccinic acid known as "Aerosol OT." The purified crystals analyzed 94.5% naphthalene.

Example IX

The procedure and apparatus identical with that of Example VII were again used except that 50 cc. of a deionized water solution containing 0.10% by weight of "Aerosol OT" were added. The purified crystals analyzed 94.4% naphthalene.

Example X

Twenty-five grams of the crude naphthalene crystals used in Example VII and 50 cc. of deionized water were added to a pint bottle. The bottle was then placed in a laboratory shaker and agitated at 368 R. P. M. for five minutes. The contents were then placed in a 100 ml. centrifuge bottle and centrifuged at 2000 R. P. M. for fifteen minutes at room temperature. The oil and water layers were removed from the crystal mass by suction with a pipette and the crystals remaining were agitated with 50 cc. of water whereupon this wash water was then removed. The remaining crystals were sucked dry on a Buechner funnel and were then placed in a desiccator for about 16 hours. Ultraviolet spectrophotometric analysis showed that these crystals now contained 93.5% naphthalene.

Example XI

The procedure and apparatus identical with that of Example X were again used except that 50 cc. of a deionized water solution containing 0.05% by weight of "Nacconol NRSF" were added. The purified crystals analyzed 94.5% naphthalene.

Example XII

The procedure and apparatus identical with that of Example X were again used except that 50 cc. of a deionized water solution containing 0.10% by weight of "Nacconol NRSF" were added. The purified crystals analyzed 98.0% naphthalene.

Example XIII

The procedure and apparatus identical with that of Example X were again used except that 50 cc. of a deionized water solution containing 0.20% by weight of "Nacconol NRSF" were added. The purified crystals analyzed 97.6% naphthalene.

The accompanying drawing is a flow diagram illustrating somewhat schematically a continuous process according to my invention.

Crude naphthalene crystals are obtained from a naphthalene-rich petroleum fraction, a 400–430° F. cut of a thermally-cracked sidestream, by passing the fraction into chilling zone 1 by line 2. The fraction is chilled to about minus 10° F., whereby a magma or paste-like slurry is formed, which is passed by line 3 to centrifugation zone 4, a perforated basket type centrifuge. Centrifuging in centrifugation zone 4 separates out the crude naphthalene crystals, which crystals are of about 65 to 75% purity. The centrifugate is removed by line 5 while the crude crystals are passed by line 6 to agitation zone 7, a vessel equipped with mechanical stirrer 8. An aqueous solution of a surface active agent is prepared in mixing zone 9 by adding water through line 10 and the agent by line 11. For example, the aqueous solution may comprise about 0.2% of an alkyl aryl sulfonate in water. The solution is formed with a minimum of agitation so that foaming is prevented. The aqueous solution is passed to agitation zone 7 by lines 11a and 19 where it is gently but thoroughly mixed with the crude naphthalene crystals from line 6 so as to reduce any tendency to emulsification. A slurry is formed which is then passed by line 12 to centrifugation zone 13 to effect a liquid-liquid separation of the oil component and the water solution-naphthalene component. The oil layer is then skimmed off the crystalline mass and passed by line 14 to water-removal zone 15, a knock-out pot, where any water present in the oil layer is separated and eliminated from the system, by line 16. The oil remaining in the knock-out pot 15 may be returned to chilling zone 1 by means of line 17 if the naphthalene content is high enough to warrant recrystallization. Or this oil may be removed from the process by means of bleed lines 18 and 5. The slurry of the water solution of the surface active agent and the naphthalene crystals is then passed by line 20 to agitation zone 21, a surge tank containing mechanical stirrer 22, where it is gently agitated to maintain the naphthalene in suspension. The stirred slurry is then passed to another centrifugation zone 23, a perforate basket-type centrifuge, by line 24 and the purified naphthalene crystals are separated from the water solution of the surface active agent. The crystals may be washed in the centrifugation zone 23 by water introduced through line 29 in order to aid in the separation of the surface active agent. The resulting liquor is eliminated from the system by line 30. The purified naphthalene crystals are then passed to drying zone 25 by conveyor 26. The surface active agent solution is returned to the agitation zone 7 by line 27, or eliminated from the system by line 28. The washed crystals are then dried as by the application of heat in drier 25 and the final product comprises naphthalene crystals of 95 to 99% purity.

I claim:

1. The method of purifying crude naphthalene crystals of petroleum origin which comprises contacting the impure naphthalene crystals with a water solution of an anionic surface active agent selected from the group consisting of an alkyl aryl sulfonate, a succinic acid derivative and an alcohol sulfate, said water solution containing the surface active agent in a small amount, subjecting the resulting mixture to the action of centrifugal force, and separating the naphthalene crystals from the centrifugate.

2. The method according to claim 1 wherein the surface active agent is an alcohol sulfate.

3. The method according to claim 1 wherein the surface active agent is an alkyl aryl sulfonate.

4. The method according to claim 1 wherein the surface active agent is a succinic acid derivative.

5. The method of purifying crude naphthalene crystals of petroleum origin which comprises contacting the impure oil-contaminated naphthalene crystals with a water solution of an anionic surface active agent selected from the group consisting of an alkyl aryl sulfonate, a succinic acid derivative and an alcohol sulfate, said water solution containing the surface active agent in small amount, subjecting the resulting mixture to the action of centrifugal force, separating the naphthalene crystals from the centrifugate, washing the naphthalene crystals so obtained, and drying the washed crystals.

6. A process for refining naphthalene having entrained impurities which comprises agitating a charge containing a mass of naphthalene crystals in an aqueous solution of an anionic surface active agent selected from the group consisting of an alkyl aryl sulfonate, a succinic acid-derivative and an alcohol sulfate, and then separating the naphthalene from the resulting mixture.

7. The method of purifying crude naphthalene crystals of petroleum origin which comprises contacting the impure naphthalene crystals with a water solution of an anionic surface active agent selected from the group consisting of an alkyl aryl sulfonate, a succinic acid derivative and an alcohol sulfate, said water solution containing the surface active agent in small amount, and then separating the naphthalene from the resulting mixture.

8. A process for refining naphthalene having entrained impurities, which comprises agitating a charge containing a mass of naphthalene crystals in an aqueous solution of an alkyl aryl sulphonate thereby emulsifying the impurities in the solution, and then separating the naphthalene from the emulsion.

References Cited in the file of this patent

UNITED STATES PATENTS

| | | |
|---|---|---|
| 1,431,394 | Gould | Oct. 10, 1922 |
| 1,441,417 | Gould | Jan. 9, 1923 |
| 1,590,965 | Downs | June 29, 1926 |
| 2,078,963 | Miller | May 4, 1937 |
| 2,403,127 | Schulze | July 2, 1946 |
| 2,499,236 | Van Gilder et al. | Feb. 10, 1950 |